United States Patent
Yoshida et al.

(10) Patent No.: US 9,853,313 B2
(45) Date of Patent: Dec. 26, 2017

(54) FUEL CELL SYSTEM, CONTROL METHOD FOR THE FUEL CELL SYSTEM, AND ELECTRIC VEHICLE EQUIPPED WITH THE FUEL CELL SYSTEM

(75) Inventors: Michio Yoshida, Miyoshi (JP); Kenji Umayahara, Miyoshi (JP); Atsushi Imai, Gamagori (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 388 days.

(21) Appl. No.: 13/258,636

(22) PCT Filed: Mar. 18, 2010

(86) PCT No.: PCT/IB2010/000558
§ 371 (c)(1),
(2), (4) Date: Sep. 22, 2011

(87) PCT Pub. No.: WO2010/112996
PCT Pub. Date: Oct. 7, 2010

(65) Prior Publication Data
US 2012/0015268 A1    Jan. 19, 2012

(30) Foreign Application Priority Data
Mar. 31, 2009    (JP) ................................ 2009-084637

(51) Int. Cl.
*H01M 8/04* (2016.01)
*H01M 8/04664* (2016.01)
(Continued)

(52) U.S. Cl.
CPC ..... *H01M 8/04679* (2013.01); *H01M 8/0488* (2013.01); *H01M 8/04223* (2013.01); *H01M 8/04388* (2013.01); *H01M 8/04402* (2013.01); *H01M 8/04559* (2013.01); *H01M 8/04567* (2013.01); *H01M 16/003* (2013.01); *H01M 8/04589* (2013.01); *H01M 8/04955* (2013.01); *H01M 2250/20* (2013.01); *Y02T 90/32* (2013.01)

(58) Field of Classification Search
None
See application file for complete search history.

(56) References Cited

U.S. PATENT DOCUMENTS

2004/0166381 A1* 8/2004 Muramoto ........ H01M 8/04007
                                                                   429/431
2007/0111058 A1* 5/2007 Yoshida ......................... 429/22
(Continued)

FOREIGN PATENT DOCUMENTS

| JP | 08-329965 A | 12/1996 |
|----|-------------|---------|
| JP | 09-120830 A | 5/1997 |

(Continued)

OTHER PUBLICATIONS

International Search Report of PCT/IB2010/000558 dated Aug. 3, 2010 & Written Opinion.
(Continued)

*Primary Examiner* — Stephan Essex
(74) *Attorney, Agent, or Firm* — Andrews Kurth Kenyon LLP

(57) ABSTRACT

A fuel cell system that includes a fuel cell that generates electricity through an electrochemical reaction between a fuel gas and an oxidant gas, and a control portion that determines whether there is leakage of the fuel gas. The control portion has start means for starting the fuel cell by raising the voltage of the fuel cell from a starting voltage to an operation voltage that is lower than an open-circuit voltage, and leakage determination means for determining whether there is leakage of the fuel gas before the voltage of the fuel cell reaches the operation voltage when the fuel cell is started.

3 Claims, 8 Drawing Sheets

(51) Int. Cl.
*H01M 8/04223* (2016.01)
*H01M 8/0438* (2016.01)
*H01M 8/04537* (2016.01)
*H01M 8/04858* (2016.01)
*H01M 16/00* (2006.01)
*H01M 8/04955* (2016.01)

(56) References Cited

U.S. PATENT DOCUMENTS

2007/0148512 A1* 6/2007 Goto et al. .................. 429/23
2009/0035612 A1   2/2009 Suematsu et al.

FOREIGN PATENT DOCUMENTS

| JP | 09120830 A * | 5/1997 |
| JP | 2007-026891 A | 2/2007 |
| JP | 2007-053000 A | 3/2007 |
| JP | 2007-134200 A | 5/2007 |
| JP | 2009-037884 A | 2/2009 |

OTHER PUBLICATIONS

Office Action dated May 24, 2011 in JP 2009-084637 and English translation thereof.

* cited by examiner

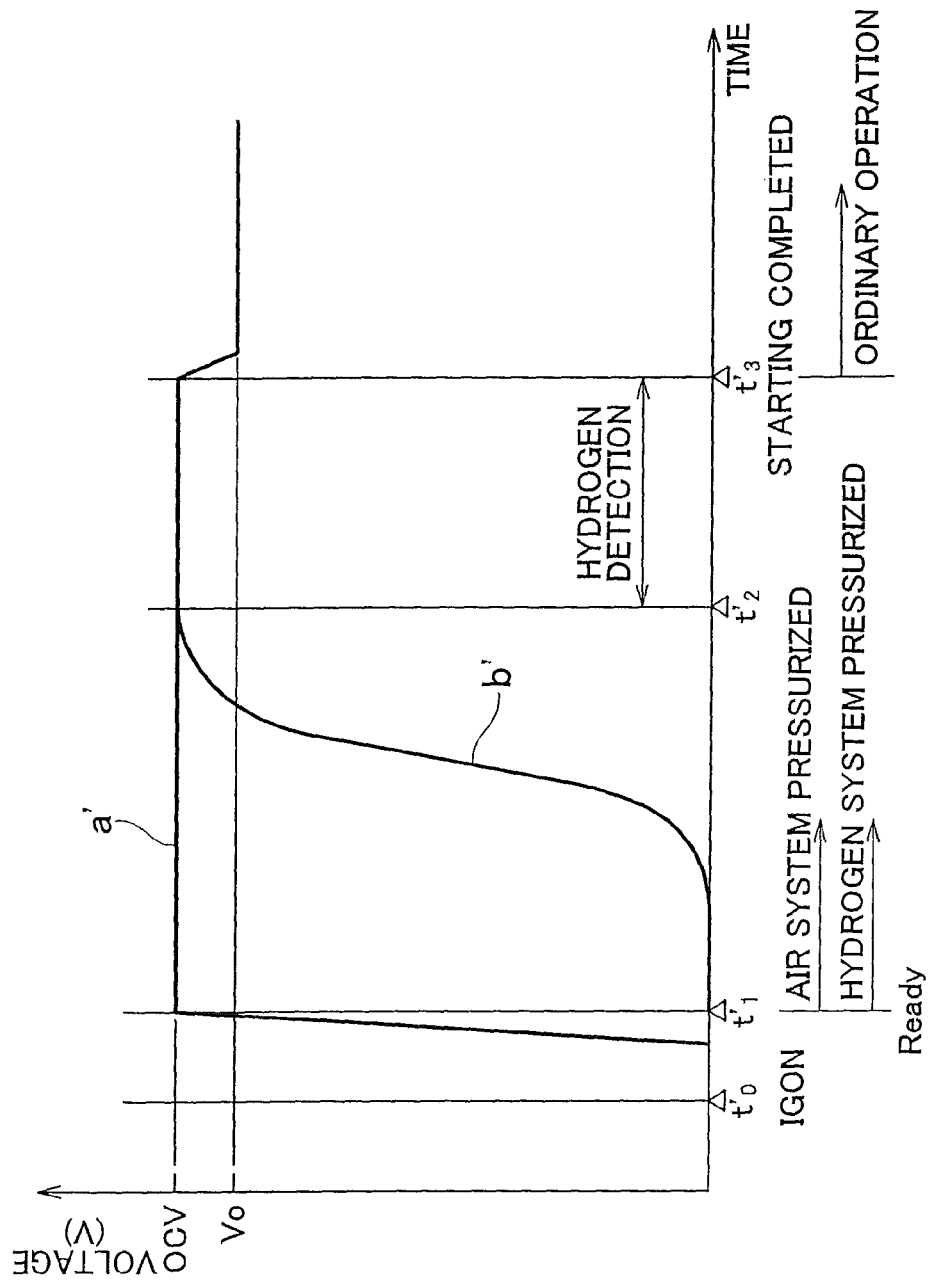

FUEL CELL SYSTEM, CONTROL METHOD FOR THE FUEL CELL SYSTEM, AND ELECTRIC VEHICLE EQUIPPED WITH THE FUEL CELL SYSTEM

This is a 371 national phase application of PCT/IB2010/000558 filed 18 Mar. 2010, claiming priority to Japanese Patent Application No. 2009-084637 filed Mar. 31 2009, the contents of which are incorporated herein by reference.

FIELD OF THE INVENTION

The invention relates to fuel cell system, a control method for the fuel cell system, and a control that is performed on an electric vehicle equipped with the fuel cell system, at the time of starting the electric vehicle.

BACKGROUND OF THE INVENTION

Practical application of a fuel cell that supplies hydrogen as a fuel gas to a fuel electrode, and that supplies air as an oxidant gas to an oxidant electrode, and that generates electricity through an electrochemical reaction between hydrogen and oxygen in the air while producing water on an oxidant electrode is now being considered.

In such a fuel cell, if at the time of start of operation, the pressure of hydrogen supplied to the fuel electrode and the pressure of air supplied to the oxidant electrode are about equal to the respective pressures occurring during ordinary operation, it sometimes happens that hydrogen gas and air are unevenly distributed in the fuel electrode and the oxidant electrode, respectively, and the electrodes are degraded by electrochemical reaction caused by the uneven distribution of these gases. Japanese Patent Application Publication No. 2007-26891 (JP-A-2007-26891) discloses a method of preventing the degradation of the electrodes of a fuel cell by causing the pressures of hydrogen and air supplied to the fuel electrode and the oxidant electrode, respectively, at the time of start of operation of the fuel cell to be higher than the ordinary supplied pressures of these gases.

However, if hydrogen gas and air are supplied at high pressure to a fuel cell when the fuel cell starts operation, it sometimes happen that the rate of rise of the voltage of the fuel cell becomes large so that the voltage of the fuel cell overshoots its upper-limit voltage. In conjunction with this problem, Japanese Patent Application Publication No. 2007-26891 (JP-A-2007-26891) discloses a method in which when hydrogen gas and air are supplied, at the time of starting a fuel cell, at pressures that are higher than their pressures given during ordinary power generation, output electric power is extracted from the fuel cell, and is put out to a vehicle driving motor, resistors, etc., provided that the voltage of the fuel cell reaches a predetermined voltage that is lower than the upper-limit voltage.

By the way, since the fuel cell uses hydrogen as a fuel gas, it is necessary to check that there is no leakage of hydrogen when the fuel cell is started. To this end, a method in which the presence/absence of hydrogen leakage from the system is determined by sealing the hydrogen system and then checking whether or not the pressure in the system becomes low. However, during the state where hydrogen and oxygen in air are undergoing an electrochemical reaction within the fuel cell, the hydrogen supplied to the fuel cell is consumed by the electrochemical reaction. Therefore, the pressure of the hydrogen system that is sealed decreases even when there is no leakage of hydrogen, and the hydrogen leakage sometimes cannot be accurately determined. Therefore, in a related-art technology as shown in FIG. 8, after an ignition key is turned on at time $t_0'$, the control value of the output voltage of the fuel cell shown by a line a' is set at an open-circuit voltage OCV. At time $t_1'$, the voltage of the fuel cell starts to be raised as shown by a line b' by supplying hydrogen and oxygen are supplied to the fuel cell, and therefore pressurizing a hydrogen system and an oxygen system. As a result, the voltage of the fuel cell is temporarily raised to the open-circuit voltage OCV. Then, in the related-art method, it is detected whether or not there is hydrogen leakage, during a period from time $t_2'$ to time $t_3'$ during which the voltage of the fuel cell remains at the open-circuit voltage OCV. When the voltage of the fuel cell reaches the open-circuit voltage OCV, the electrochemical reaction between hydrogen and oxygen within the fuel cell does not progress any longer, so that the hydrogen in the sealed hydrogen system is not consumed. Therefore, a state in which the pressure of the sealed hydrogen system undergoes hardly any decrease can be created if there is no leakage of hydrogen. Then, it can be determined whether or not there is hydrogen leakage by detecting the degree of pressure decrease of the hydrogen system during the foregoing state. However, when the voltage of the fuel cell reaches the open-circuit voltage OCV, the durability of the fuel cell can be adversely affected.

SUMMARY OF THE INVENTION

The invention provides a fuel cell system that determines whether there is hydrogen leakage, while restraining the adverse influence on the durability of the fuel cell when the fuel cell is started, and also provides a control method for the fuel cell system, and an electric vehicle that is equipped with the fuel cell system.

A first aspect of the invention relates to a fuel cell system. This fuel cell system includes: a fuel cell that generates electricity through an electrochemical reaction between a fuel gas and an oxidant gas; and a control portion that determines whether there is leakage of the fuel gas. The control portion has: start means for starting the fuel cell by raising voltage of the fuel cell from a starting voltage to an operation voltage that is lower than an open-circuit voltage; and leakage determination means for determining whether there is leakage of the fuel gas, before the voltage of the fuel cell reaches the operation voltage when the fuel cell is started.

The foregoing fuel cell system may further include: fuel gas supply means for supplying the fuel gas to a fuel electrode of the fuel cell; and oxidant gas supply means for supplying the oxidant gas to an oxidant electrode of the fuel cell, and the start means may raise the voltage of the fuel cell by supplying the fuel gas to the fuel electrode of the fuel cell by the fuel gas supply means and then supplying the oxidant gas to the oxidant electrode by the oxidant gas supply means, and the leakage determination means may determine whether there is leakage of the fuel gas during a period from when the fuel gas is supplied to when the oxidant gas starts to be supplied.

In the fuel cell system, the fuel gas supply means may include a fuel gas supply channel, and a fuel supply valve provided in the fuel gas supply channel, and may further include a gas discharge channel that discharges a post-reaction fuel gas from the fuel electrode of the fuel cell, a gas discharge valve provided in the gas discharge channel, and a pressure sensor that detects pressure in the fuel gas channel that is on a fuel electrode side of the fuel supply valve, and that is on a fuel electrode side of the gas discharge valve, and the leakage determination means may close the fuel supply valve and the gas discharge valve, and may determine whether there is leakage of the fuel gas based on a rate of pressure decrease that is detected by the pressure sensor.

A second aspect of the invention relates to a fuel cell system. This fuel cell system includes: a fuel cell that generates electricity through an electrochemical reaction between a fuel gas and an oxidant gas; fuel gas supply means for supplying the fuel gas to a fuel electrode of the fuel cell; oxidant gas supply means for supplying the oxidant gas to an oxidant electrode of the fuel cell; and a control portion that determines whether there is leakage of the fuel gas. The control portion includes: start means for starting the fuel cell by lowering voltage of the fuel cell from a starting voltage to an operation voltage that is lower than an open-circuit voltage at a time of starting the fuel cell if the starting voltage of the fuel cell is lower than the open-circuit voltage, but is higher than the operation voltage, and by supplying the fuel gas to the fuel electrode of the fuel cell by the fuel gas supply means, and then by supplying the oxidant gas to the oxidant electrode by the oxidant gas supply means; and leakage determination means for determining whether there is leakage of the fuel gas during a period from when the fuel gas is supplied to when the oxidant gas starts to be supplied.

In this fuel cell system, the fuel gas supply means may include a fuel gas supply channel, and a fuel supply valve provided in the fuel gas supply channel, and may further include a gas discharge channel that discharges a post-reaction fuel gas from the fuel electrode of the fuel cell, a gas discharge valve provided in the gas discharge channel, and a pressure sensor that detects pressure in the fuel gas channel that is on a fuel electrode side of the fuel supply valve, and that is on a fuel electrode side of the gas discharge valve, and the leakage determination means may close the fuel supply valve and the gas discharge valve at a time of starting the fuel cell, and may determine whether there is leakage of the fuel gas from a first rate of pressure decrease detected via the pressure sensor, and a second rate of pressure decrease based on an amount of consumption of the fuel gas estimated from an output current of the fuel cell.

In this fuel cell system, the leakage determination means may calculate a third rate of pressure decrease by subtracting the second rate of pressure decrease from the first rate of pressure decrease, and may determine that there is leakage of the fuel gas if the third rate of pressure decrease is greater than or equal to a first threshold value. Besides, the leakage determination means may determine that there is leakage of the fuel gas if the first rate of pressure decrease is greater than or equal to a second threshold value that is greater than the first threshold value.

A third aspect of the invention relates to an electric vehicle. This electric vehicle is equipped with the foregoing fuel cell system.

A fourth aspect of the invention relates to a control method for a fuel cell system. This method is a control method for a fuel cell system that includes a fuel cell that generates electricity through an electrochemical reaction between a fuel gas and an oxidant gas, and includes: starting the fuel cell by raising voltage of the fuel cell from a starting voltage to an, operation voltage that is lower than an open-circuit voltage; and determining whether there is leakage of the fuel gas, before the voltage of the fuel cell reaches the operation voltage when the fuel cell is started.

A fifth aspect of the invention relates to a control method for a fuel cell system. This method is a control method for a fuel cell system that includes a fuel cell that generates electricity through an electrochemical reaction between a fuel gas and an oxidant gas, a fuel gas supply portion that supplies the fuel gas to a fuel electrode of the fuel cell, and an oxidant gas supply portion that supplies the oxidant gas to an oxidant electrode of the fuel cell. The control method includes: starting the fuel cell by lowering voltage of the fuel cell from a starting voltage to an operation voltage that is lower than an open-circuit voltage at a time of starting the fuel cell if the starting voltage of the fuel cell is lower than the open-circuit voltage, but is higher than the operation voltage, and by supplying the fuel gas to the fuel electrode of the fuel cell by the fuel gas supply portion, and then by supplying the oxidant gas to the oxidant electrode by the oxidant gas supply portion; and determining whether there is leakage of the fuel gas during a period from when the fuel gas is supplied to when the oxidant gas starts to be supplied.

The invention achieves an effect of being able to determine whether there is hydrogen leakage, without impairing the durability of the fuel cell, when the fuel cell is started.

BRIEF DESCRIPTION OF THE DRAWINGS

The foregoing and further features and advantages of the invention will become apparent from the following description of preferred embodiments with reference to the accompanying drawings, wherein like numerals are used to represent like elements and wherein:

FIG. 8 is a graph showing increases in the voltage in a related-art fuel cell system when the system is started.

DETAILED DESCRIPTION OF THE EMBODIMENTS

Figure 1:
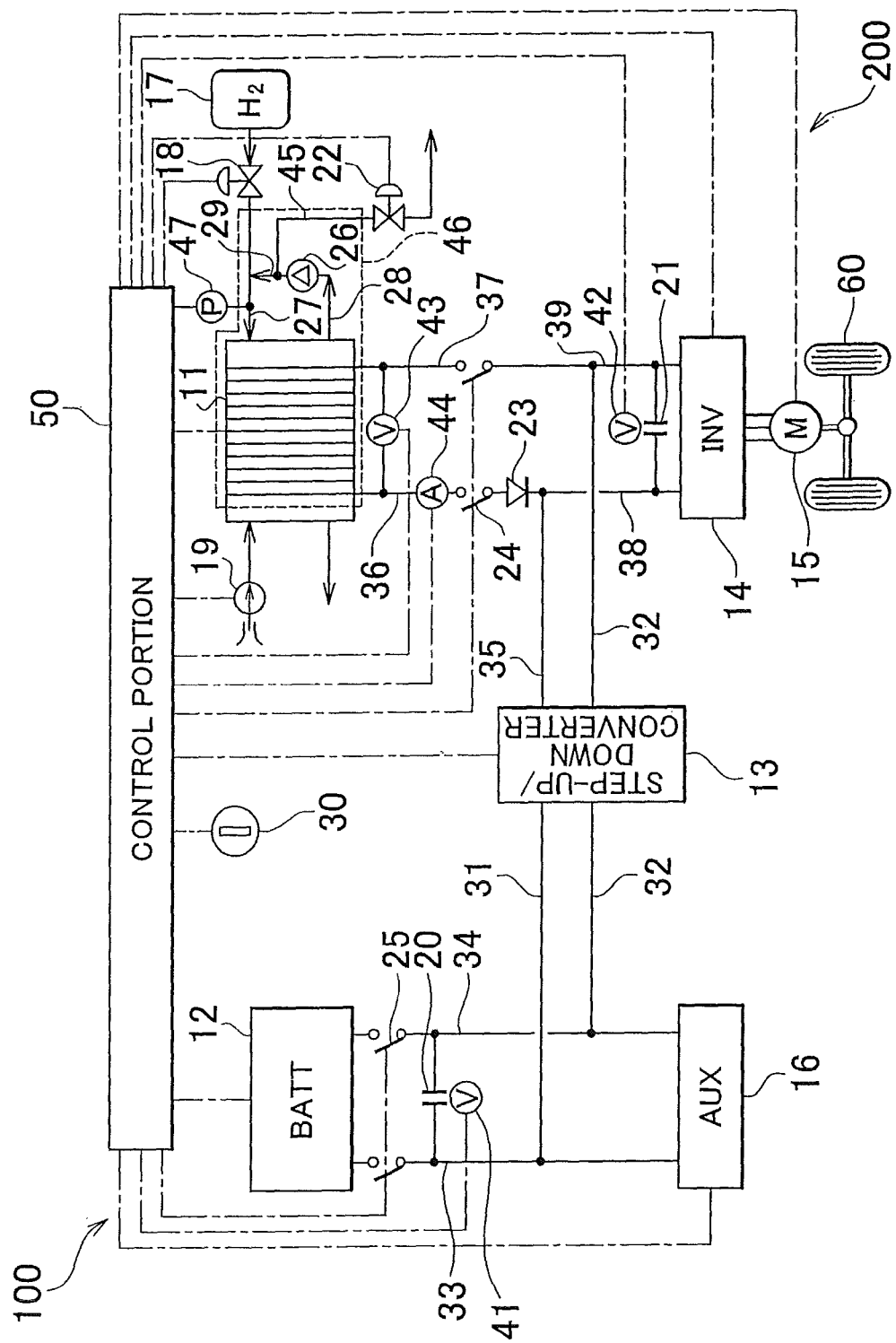
FIG. 1 is a system diagram of a fuel cell system in accordance with an embodiment of the invention.

As shown in FIG. 1, a fuel cell system 100 mounted in an electric vehicle 200 includes a chargeable and dischargeable secondary cell 12, a step-up/down voltage converter 13 that raises or lowers the voltage of the secondary cell 12, an inverter 14 that converts direct-current electric power of the step-up/down voltage converter 13 into alternating-current electric power, and supplies the electric power to a traction motor 15, and a fuel cell 11.

The secondary cell 12 is constructed of a chargeable and dischargeable lithium-ion battery, or the like. The voltage of the secondary cell 12 in this embodiment is lower than the drive voltage of the traction motor 15. However, the voltage of the secondary cell is not limited so, but may also be a voltage that is equivalent to or higher than the drive voltage of the traction motor. The step-up/down voltage converter 13 includes a plurality of switching elements, and converts a primary-side voltage supplied from the secondary cell 12 to a secondary-side voltage for driving the traction motor, by the on/off operations of the switching elements. The step-up/down voltage converter 13 is a non-insulated bidirectional DC/DC converter whose reference electrical path 32 is connected to both a minus-side electrical path 34 of the secondary cell 12 and a minus-side electrical path 39 of the inverter 14, and whose primary-side electrical path 31 is connected to a plus-side electrical path 33 of the secondary cell 12, and whose secondary-side electrical path 35 is connected to a plus-side electrical path 38 of the inverter 14. Besides, the plus-side electrical path 33 and the minus-side electrical path 34 of the secondary cell 12 are each provided with a system relay 25 that turns on and off the connection between the secondary cell 12 and a load system.

The fuel cell 11 is supplied with a hydrogen gas, which is a fuel gas, and with air, which is an oxidant gas, and generates electric power though an electrochemical reaction between the hydrogen gas and the oxygen in the air. In the fuel cell 11, hydrogen gas is supplied from a high-pressure hydrogen tank 17 to a fuel electrode (anode) through a hydrogen supply pipe 27 that is provided with a hydrogen supply valve 18, and air is supplied to an oxidant electrode (cathode) by an air compressor 19. Herein, the hydrogen-supply valve 18 is a fuel supply valve, and the hydrogen supply pipe 27 is a fuel gas supply channel. A pressure sensor 47 that detects the pressure in a hydrogen system is attached to the hydrogen supply pipe 27. The hydrogen supplied, and the oxygen in the air supplied undergo an electrochemical reaction within the fuel cell 11, thus outputting electricity, and producing water at the oxidant electrode. The produced water is discharged out of the fuel cell, together with the air that has been used for the reaction. On the other hand, the hydrogen supplied to the fuel electrode changes to a reaction gas whose hydrogen concentration has decreased due to the reaction, and then is discharged through a hydrogen gas discharge pipe 28. The discharged reaction gas is pressurized by a hydrogen circulation pump 26 that is provided on a recirculation pipe 29, so as to be circulated into the hydrogen supply pipe 27 and therefore to the fuel electrode. The amount of hydrogen consumed by the reaction is supplied from the hydrogen tank 17 into the hydrogen supply pipe 27 by adjusting the degree of opening of the hydrogen supply valve 18. Besides, the gas that resides at the fuel electrode, including nitrogen gas, etc., is discharged, together with the post-reaction gas, to the outside through a gas discharge pipe 45. A gas discharge valve 22 that adjusts the amount of gas discharged is attached to the gas discharge pipe 45. As described above, the hydrogen system is provided as a circulation system. Therefore, when the hydrogen supply valve 18 and the gas discharge valve 22 are closed, a region 46 that includes the hydrogen supply pipe 27 on the fuel electrode side of the hydrogen supply valve 18, a fuel-side portion of the fuel cell 11, the hydrogen gas discharge pipe 28, the hydrogen circulation pump 26, the recirculation pipe 29, and the gas discharge pipe 45 on the fuel electrode side of the gas discharge valve 22 assumes a sealed state.

A plus-side electrical path 36 of the fuel cell 11 is connected to the secondary-side electrical path 35 of the step-up/down voltage converter 13 via an FC relay 24 and a blocking diode 23. A minus-side electrical path 37 of the fuel cell 11 is connected to the reference electrical path 32 of the step-up/down voltage converter 13 via another FC relay 24. The secondary-side electrical path 35 of the step-up/down voltage converter 13 is connected to the plus-side electrical path 38 of the inverter 14, and the reference electrical path 32 of the step-up/down voltage converter 13 is connected to the minus-side electrical path 39 of the inverter 14. The plus-side electrical path 36 and the minus-side electrical path 37 of the fuel cell 11 are connected to the plus-side electrical path 38 and the minus-side electrical path 39, respectively, of the inverter 14, via the FC relays 24. The FC relays 24 turn on and off the connection between the load system and the fuel cell 11. When the FC relays 24 are closed, the fuel cell 11 is connected to the secondary side of the step-up/down voltage converter 13, so that the electric power generated by the fuel cell 11 is supplied together with the secondary-side electric power of the secondary cell 12 obtained by raising the voltage of the primary-side electric power of the secondary cell 12, to the inverter, which thereby drives the traction motor 15 that rotates wheels 60. At this time, the voltage of the fuel cell 11 becomes equal to the output voltage of the step-up/down voltage converter 13 and to the input voltage of the inverter 14. Besides, the air compressor 19, and accessories 16 of the fuel cell 11 that include a cooling water pump, a hydrogen circulation pump 26, etc., are supplied with drive electric power from the secondary cell 12.

A primary-side capacitor 20 that smoothes the primary-side voltage is connected between the plus-side electrical path 33 and the minus-side electrical path 34 of the secondary cell 12. The primary-side capacitor 20 is provided with a voltage sensor 41 that detects the voltage between the two ends of the primary-side capacitor 20. Besides, a secondary-side capacitor 21 that smoothes the secondary-side voltage is provided between the plus-side electrical path 38 and the minus-side electrical path 39 of the inverter 14. The secondary-side capacitor 21 is provided with a voltage sensor 42 that detects the voltage between the two ends of the secondary-side capacitor 21. The voltage across the primary-side capacitor 20 is a primary-side voltage $V_L$ that is the input voltage of the step-up/down voltage converter 13, and the voltage across the secondary-side capacitor 21 is a secondary-side voltage $V_H$ that is the output voltage of the step-up/down voltage converter 13. Besides, a voltage sensor 43 that detects the voltage of the fuel cell 11 is provided between the plus-side electrical path 36 and the minus-side electrical path 37 of the fuel cell 11, and an electric current sensor 44 that detects the output current of the fuel cell 11 is provide on the plus-side electrical path 36 of the fuel cell 11.

A control portion 50 is a computer that contains a CPU that performs signal processing, and a storage portion that stores programs and control data. The fuel cell 11, the air compressor 19, the step-up/down voltage converter 13, the inverter 14, the traction motor 15, the accessories 16, the hydrogen supply valve 18, the gas discharge valve 22, the FC relays 24, and the system relays 25 are connected to the control portion 50, and are constructed so as to operate according to commands from the control portion 50. Besides, the secondary cell 12, the voltage sensors 41 to 43, the electric current sensor 44, and the pressure sensor 47 are each connected to the control portion 50, and are constructed so that the state of the secondary cell 12, and detection signals of the voltage sensors 41 to 43, the electrical current sensor 44, and the pressure sensor 47 are input to the control portion 50. The electric vehicle 200 is provided with an ignition key 30 that is a switch for starting and stopping the fuel cell system 100. The ignition key 30 is connected to the control portion 50, and is constructed so that an on/off-signal of the ignition key 30 is input to the control portion 50.

Figure 2:
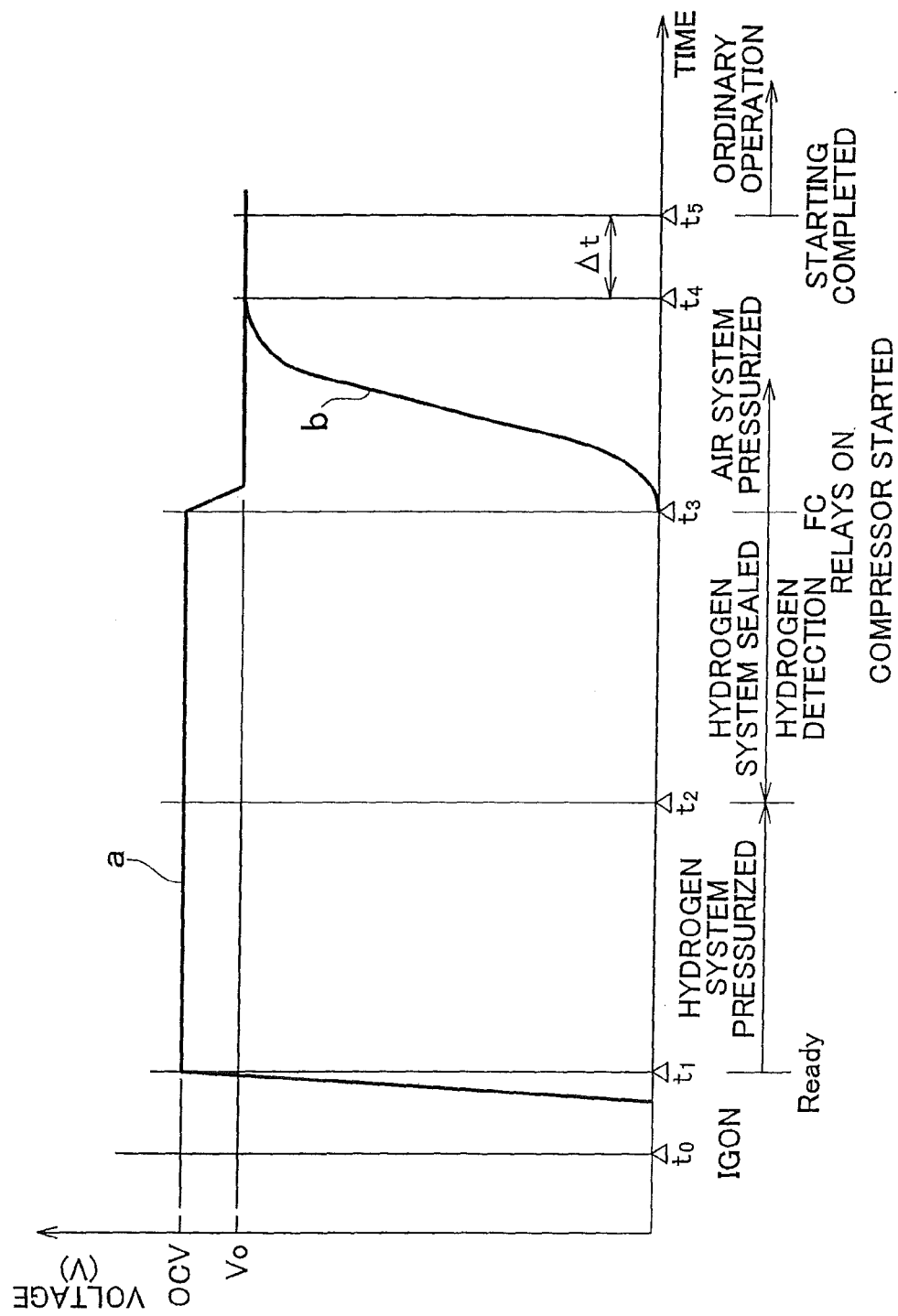
FIG. 2 is a graph showing increases in the voltage when the fuel cell system in the embodiment of the invention is started.

Operations of the fuel cell system 100 constructed as described above will be described with reference to FIG. 2 to FIG. 4. In FIG. 2, a line a shows the secondary-side voltage $V_H$ that is the output voltage of the step-up/down voltage converter 13, and a line b shows the FC voltage $V_F$ that is the voltage of the fuel cell 11. The fuel cell 11 is started from a state of zero voltage as shown in FIG. 2.

Figure 4:
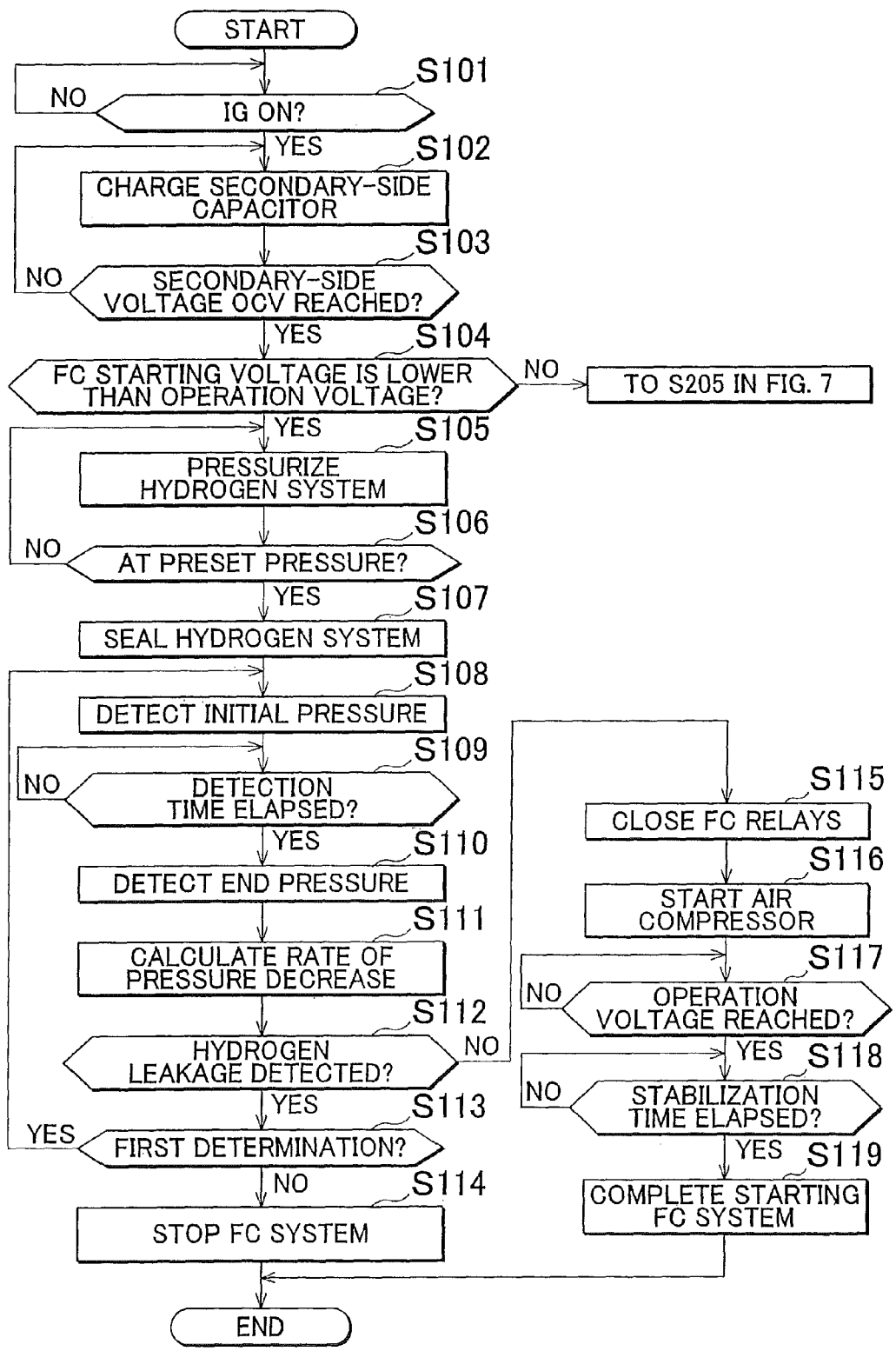
FIG. 4 is a flowchart showing an operation performed when the fuel cell system in the embodiment of the invention is started.

When a driver, that is, an operating person, turns on the ignition key 30 at time $t_0$ shown in FIG. 2, the on-signal from the ignition key 30 is input to the control portion 50, whereby the control portion 50 recognizes the on-state of the ignition key 30 as shown in step S101 in FIG. 4. When the on-signal of the ignition key 30 is input, the control portion 50 closes the system relays 25 to connect the secondary cell 12 to the system, so that the primary-side capacitor 20 is charged by the electric power supplied from the secondary cell 12. After that, the control portion 50 starts the voltage raising operation of the step-up/down voltage converter 13 to start the charging of the secondary-side capacitor 21, as shown in steps S102 and S103 in FIG. 4. The control portion 50 raises the secondary-side voltage $V_H$ while detecting the secondary-side voltage $V_H$ by the voltage sensor 42. When the secondary-side voltage $V_H$ reaches the open-circuit voltage OCV, the charging of the secondary-side capacitor 21 is completed, and the supply of electric power from the secondary cell 12 becomes possible. Therefore, at time $t_1$ shown in FIG. 2, the control portion 50 lights a READY lamp to indicate that the preparation for supplying electric power to the traction motor 15 has been completed. When the driver depresses an accelerator pedal after the READY lamp is lighted, the electric power from the secondary cell 12 is supplied to the traction motor 15 that rotates the wheels 60, so that the electric vehicle 200 can start to move. Although electric power is supplied from the secondary cell 12 to the traction motor 15, electric power does not flow into the fuel cell 11 since the FC relays 24 are open and therefore the fuel cell 11 is cut off from the system.

The control portion 50 acquires the value of the starting voltage $V_{F0}$ of the fuel cell 11 from the voltage sensor 43, and compares the value with an operation voltage $V_0$, as shown in step S104 in FIG. 4. The operation voltage $V_0$ is lower than the open-circuit voltage OCV. Then, for example, if the starting voltage $V_{F0}$ of the fuel cell 11 is lower than the operation voltage $V_0$ that is lower than the open-circuit voltage OCV as shown in FIG. 2, the control portion 50 outputs a command to pressurize the hydrogen system as shown in step S105 in FIG. 4, at time $t_1$ shown in FIG. 2. Due to this command, the hydrogen supply valve 18 is opened, so that hydrogen starts to be supplied from the hydrogen tank 17 to the fuel cell 11. When hydrogen is supplied, the pressure at the fuel electrode of the fuel cell 11 rises. However, since the oxidant electrode has not been supplied with air, the electrochemical reaction does not occur within the fuel cell 11, and therefore the fuel cell 11 does not generate electricity. Thus, at this time, the FC voltage $V_F$ of the fuel cell 11 is zero, as is the case with the starting voltage $V_{F0}$ of the fuel cell 11.

Besides, if the starting voltage $V_{F0}$ of the fuel cell 11 is higher than the operation voltage $V_0$, the control portion 50 jumps to step S205 shown in FIG. 7 (described later), in which the control portion 50 closes the FC relays 24.

When the control portion 50 determines that the pressure of the hydrogen system detected by the pressure sensor 47 has reached a certain pressure, for example, the pressure occurring during ordinary operation, as shown in step S106 in FIG. 4, the control portion 50 outputs a command to seal the hydrogen system as shown in step S107 in FIG. 4. Due to this command, the hydrogen supply valve 18 and the gas discharge valve 22 are closed at time $t_2$ shown in FIG. 2. Due to this operation, the region 46 that includes the hydrogen supply pipe 27 on the fuel electrode side of the hydrogen supply valve 18, the fuel-side portion of the fuel cell 11, the hydrogen gas discharge pipe 28, the hydrogen circulation pump 26, the recirculation pipe 29, and the gas discharge pipe 45 on the fuel electrode side of the gas discharge valve 22 assumes a sealed state. At this time, since the air compressor 19 has not been started, the oxidant electrode has not been supplied with air, that is, the oxidant gas. Therefore, the hydrogen in the sealed region 46 does not react with oxygen, so that the amount of hydrogen in the region 46 hardly decreases.

Figure 3:
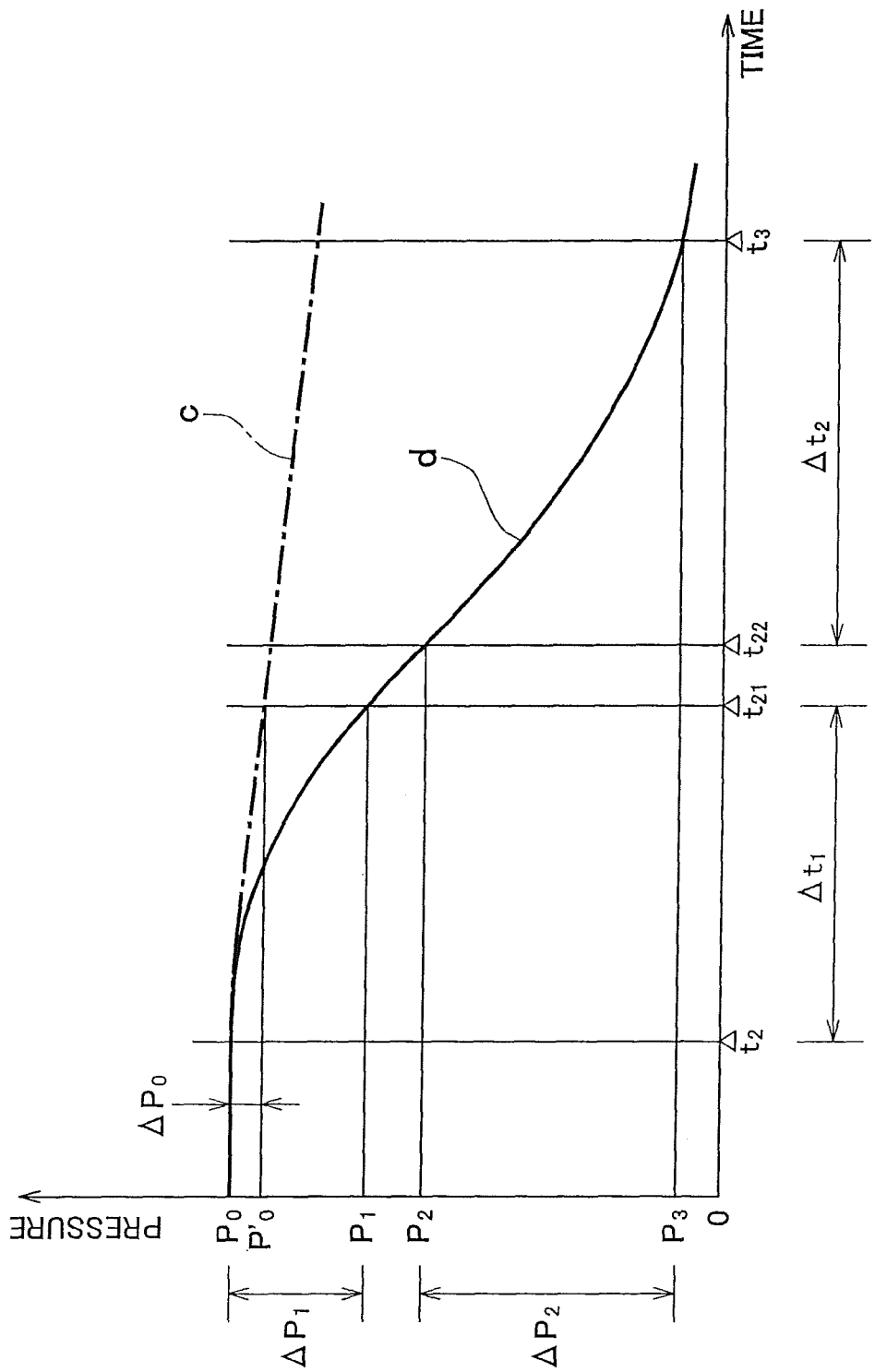
FIG. 3 is a graph showing decreases in the pressure of a sealed hydrogen system when the fuel cell system in the embodiment of the invention is started.

As shown in FIG. 3, although the region 46 shown in FIG. 1 is sealed, the pressure slightly decreases from a pressure $P_0$ as shown by a dashed one-dotted line c in FIG. 3 due to cross leak between the fuel electrode and the oxidant electrode of the fuel cell 11. That is, as shown in FIG. 3, over the time interval $\Delta t_1$ between time $t_2$ and time $t_{21}$, the pressure decreases from the initial pressure $P_0$ to an end pressure $P_0'$ that occurs at the end of the interval, by $\Delta P_0$.

On the other hand, if there is leakage of hydrogen gas from the sealed hydrogen system, the pressure in the sealed region 46 shown in FIG. 1 decreases by an amount $\Delta P_1$ from the initial pressure $P_0$ at time $t_2$ to an end pressure $P_1$ at time $t_{21}$. The pressure decrease $\Delta P_1$ in the time interval $\Delta t_1$ from time $t_2$ to time $t_{21}$ is considerably larger than the pressure decrease $\Delta P_0$ that occurs in the case where there is no leakage of hydrogen. The control portion 50 calculates a rate of pressure decrease that occurs in the case where there is no hydrogen leakage, from the time interval $\Delta t_1$ and the pressure decrease $\Delta P_0$, and stores the result of the calculation in a memory. Then, the control portion 50 determines the presence/absence of hydrogen leakage by comparing the rate of pressure decrease calculated from the pressure decrease $\Delta P_1$ detected during the time interval $\Delta t_1$ with the stored rate of pressure decreased.

When the hydrogen system becomes sealed, the control portion 50 acquires the value of the initial pressure $P_0$ in the region 46 shown in FIG. 1 which has been sealed, via the pressure sensor 47 as shown in step S108 in FIG. 4, and then waits for the time interval $\Delta t_1$ that is a certain time shown in FIG. 3, as shown in step S109 in FIG. 4. After that, the control portion 50 acquires the value of the pressure $P_1$ that occurs at the elapse of the time interval $\Delta t_1$ via the pressure sensor 47, as the end pressure occurring at the end of the time interval, as shown in step S110 in FIG. 4. Then, the control portion 50 calculates a rate of pressure decrease in the time interval $\Delta t_1$ as shown in step S111 in FIG. 4, and then determines the presence/absence of hydrogen leakage by comparing the calculated rate of pressure decrease with the rate of pressure decrease that occurs in the case where there is no hydrogen leakage, as shown in step S112 in FIG. 4.

If the control portion 50 determines that there is hydrogen leakage in step S112 in FIG. 4, the control portion 50 then determines whether or not the determination of the presence of hydrogen leakage has been made for the first time, as shown in step S113 in FIG. 4, in order to avoid the stop of the fuel cell system 100 caused by a false determination. Then, if the determination of the presence of hydrogen leakage is the first determination, the control portion 50 returns to step S108 in FIG. 4, in which the control portion 50 acquires the value of the initial pressure again.

Since as shown in FIG. 3, it is after the first determination of the presence/absence of hydrogen that the value of the initial pressure is acquired again, the pressure $P_2$ of time $t_{22}$ after time $t_{21}$ shown in FIG. 3 is acquired as the initial pressure. Then, the pressure $P_3$ occurring at a certain time interval $\Delta t_2$ following time t22 is acquired as the end-interval pressure, and a rate of pressure decrease is calculated from a pressure difference $\Delta P_2$ between the pressure $P_2$ and the pressure $P_3$, and from the certain time $\Delta t_2$. The presence/absence of hydrogen leakage is determined by comparing the calculated rate of pressure decrease with the rate of pressure decrease that occurs when there is no hydrogen leakage.

If it is determined in the second presence/absence determination regarding hydrogen leakage that there is hydrogen leakage, the control portion 50 stops the fuel cell system 100 as shown in step S114 in FIG. 4.

On the other hand, if it is determined in the first or second determination of the presence/absence of hydrogen leakage that there is no hydrogen leakage, the control portion 50 closes the FC relays 24 at time $t_3$ in FIG. 2 to connect the fuel cell 11 and a load system in step S115 in FIG. 4, and then starts the air compressor 19 as shown in step S116 in FIG. 4. As the air compressor 19 is started, the supply of air to the fuel cell 11 starts. As air begins to be supplied to the fuel cell 11, the electrochemical reaction between the hydrogen and the oxygen begins in the air within the fuel cell 11. Therefore, the FC voltage $V_F$ of the fuel cell 11 detected by the voltage sensor 43 gradually increases from the starting voltage, that is, zero, as shown by the line b in FIG. 2, and reaches the operation voltage $V_0$ at time $t_4$ shown in FIG. 2.

The control portion 50, after determining that the FC voltage $V_F$ of the fuel cell 11 has reached the operation voltage $V_0$ as shown in step S117 in FIG. 4, holds the state of the fuel cell system 100 for a stabilization time $\Delta t$ from time $t_4$ to time $t_5$ shown in FIG. 2 as shown in step S118 in FIG. 4. Then, the control portion 50 completes the starting of the fuel cell system 100 at time $t_5$ shown in FIG. 2 as shown in step S119 in FIG. 4, and shifts to the ordinary operation.

In this embodiment, the presence/absence of leakage of hydrogen gas at the time of starting can be determined without a need to raise the FC voltage $V_F$ of the fuel cell 11 to the open-circuit voltage OCV. Therefore, the presence/absence of hydrogen leakage can be determined without impairing the durability of the fuel cell 11.

Next, another example of the starting of the fuel cell system 100 of this embodiment will be described with reference to FIGS. 5 to 7. Portions shown in FIGS. 5 to 7 that are substantially the same as those described above with reference to FIGS. 2 to 4 are represented by the same reference characters, and descriptions thereof are omitted below. In this embodiment, the starting voltage $V_{F0}$ of the fuel cell 11 is equal to the open-circuit voltage OCV that is higher than the operation voltage $V_0$.

Figure 7:
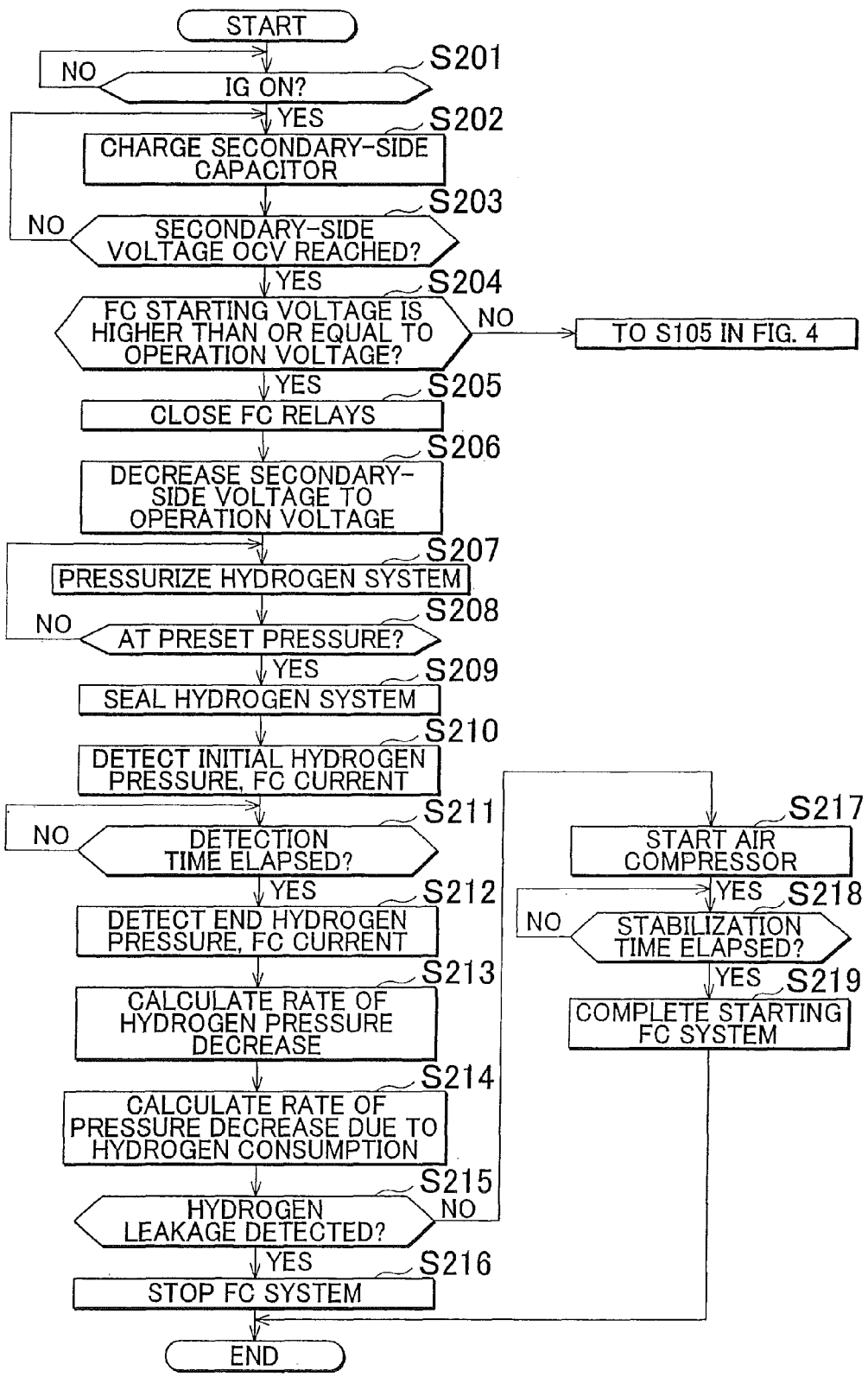
FIG. 7 is a flowchart showing another operation performed when the fuel cell system in the embodiment of the invention is started.

As in the foregoing embodiment, the control portion 50, after recognizing the turning-on of the ignition key 30 as shown in step S201 in FIG. 7, closes the system relays 25 and then starts an operation of the step-up/down voltage converter 13. Then, as shown in steps S202 and S203 in FIG. 7, the control portion 50 charges the secondary-side capacitor 21 to raise the secondary-side voltage $V_H$, which is the output voltage of the step-up/down voltage converter 13, to the open-circuit voltage OCV of the fuel cell 11. Then, at time $t_{12}$ in FIG. 5, the secondary-side voltage $V_H$ reaches the open-circuit voltage OCV. After the secondary-side voltage $V_H$ reaches the open-circuit voltage OCV, it is possible to supply electric power from the secondary cell 12 to the traction motor 15, and therefore the control portion 50 turns on the READY lamp at time $t_{11}$. After that, the electric vehicle 200 can start moving as the driver depresses the accelerator pedal. However, at this time point, the FC relays 24 are open, and therefore the fuel cell 11 is disconnected from the system, so that electric power does not flow into the fuel cell 11.

The control portion 50 acquires the value of the starting voltage $V_{F0}$ of the fuel cell 11 from the voltage sensor 43, and compares it with the operation voltage $V_0$, as shown in step S204 in FIG. 7. As in the foregoing embodiment, the operation voltage $V_0$ is lower than the open-circuit voltage OCV. Then, if the starting voltage $V_{F0}$ is higher than the operation voltage $V_0$, the control portion 50 closes the FC relays 24 as shown in step S205 in FIG. 7. In this embodiment, the starting voltage $V_{F0}$ of the fuel cell 11 is equal to the open-circuit voltage OCV as shown in FIG. 5. After that, the control portion 50 lowers the secondary-side voltage $V_H$, which is the output voltage of the step-up/down voltage converter 13, from the open-circuit voltage OCV to the operation voltage $V_0$, as shown by a line e in FIG. 5, in step S206 in FIG. 7. Then, as the secondary-side voltage $V_H$ decreases, the voltage $V_F$ of the fuel cell 11 decreases from the open-circuit voltage OCV, and an electric current $A_F$ is output from the fuel cell 11 as shown by a line f in FIG. 5.

Besides, if the starting voltage $V_{F0}$ of the fuel cell 11 is lower than the operation voltage $V_0$, the control portion 50 jumps to step S105 in FIG. 4 described above, in which the control portion 40 starts the pressurization of the hydrogen system.

Figure 5:
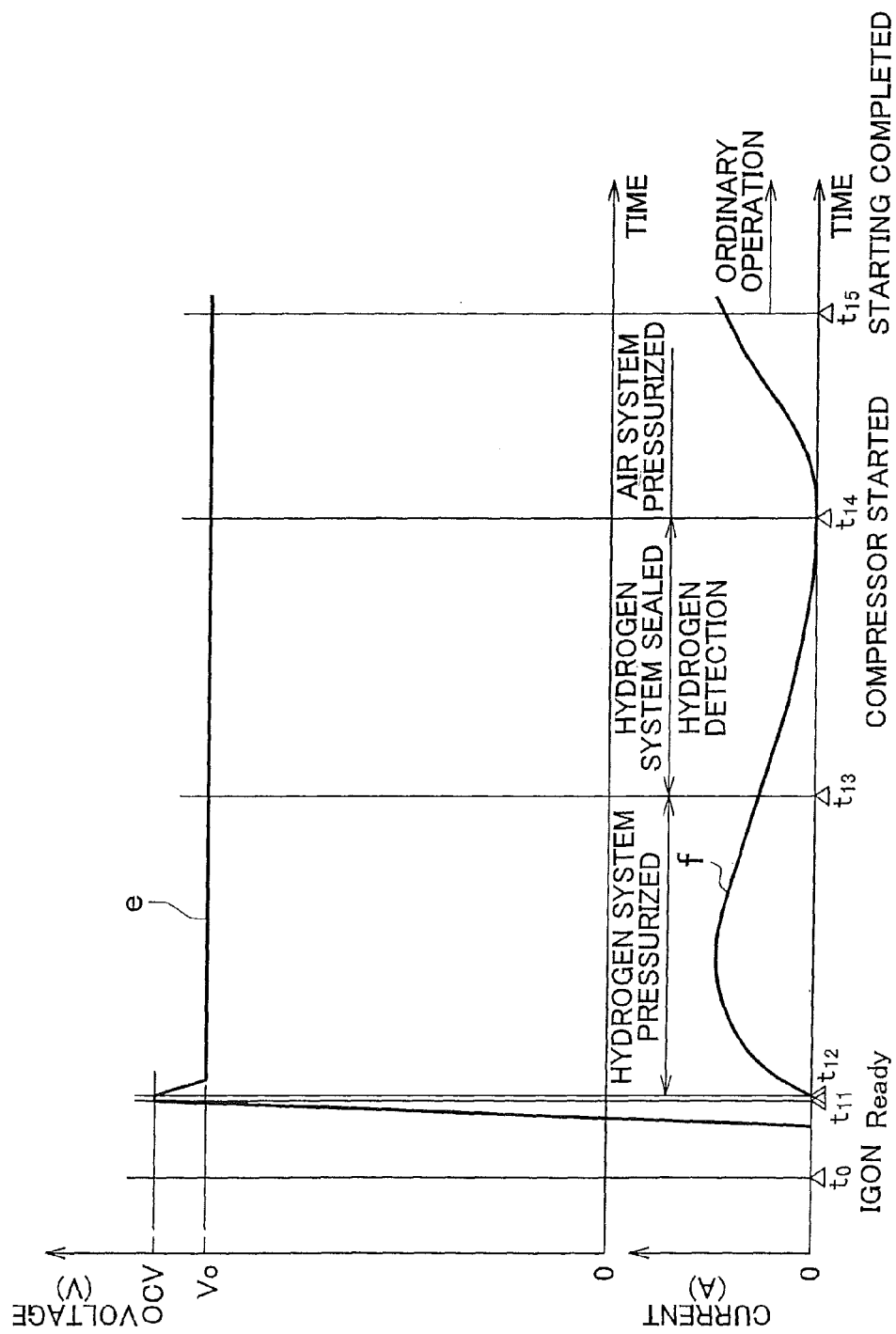
FIG. 5 is a graph showing another example of increases in the voltage occurring when the fuel cell system in the embodiment of the invention is started.

The control portion 50 outputs a command to pressurize the hydrogen system at time $t_{12}$ immediately following time $t_{11}$ in FIG. 5 after the secondary-side voltage $V_H$ reaches the open-circuit voltage OCV. Due to this command, the hydrogen supply valve 18 is opened, so that hydrogen starts to be supplied from the hydrogen tank 17 to the fuel cell 11. The FC voltage $V_F$ of the fuel cell 11 is kept at the operation voltage $V_0$ as is the case with the secondary-side voltage $V_H$. Therefore, the fuel cell 11 continues outputting current after the voltage of the fuel cell 11 is lowered from the starting voltage $V_{F0}$, which is equal to the open-circuit voltage OCV, to the operation voltage $V_0$.

After determining that the pressure of the hydrogen system has reached a certain pressure, for example, an ordinary operation pressure, as shown in step S208 in FIG. 7, the control portion 50 outputs a command to seal the hydrogen system as shown in step S209 in FIG. 7. Due to this command, the hydrogen supply valve 18 and the gas discharge valve 22 shown in FIG. 1 are closed at time $t_{13}$ shown in FIG. 5. Due to this, the region 46, which includes the hydrogen supply pipe 27 on the fuel electrode side of the hydrogen supply valve 18, the fuel-side portion of the fuel cell 11, the hydrogen gas discharge pipe 28, the hydrogen circulation pump 26, the recirculation pipe 29, and the gas discharge pipe 45 on the fuel electrode side of the gas discharge valve 22, assumes a sealed state. At this time, since the air compressor 19 has not been started, the oxidant electrode has not been supplied with air, that is, the oxidant gas. However, since the fuel cell 11 is in a state in which the electric current produced by the electricity generation is output due to the voltage of the fuel cell 11 having been lowered from the open-circuit voltage OCV to the operation voltage $V_0$, the hydrogen at the fuel electrode is consumed in the reaction with the oxygen contained in the air that remains at the oxidant electrode. Therefore, although the region 46 is sealed, the pressure of the hydrogen system decreases by an amount that corresponds to the output current.

Figure 6:
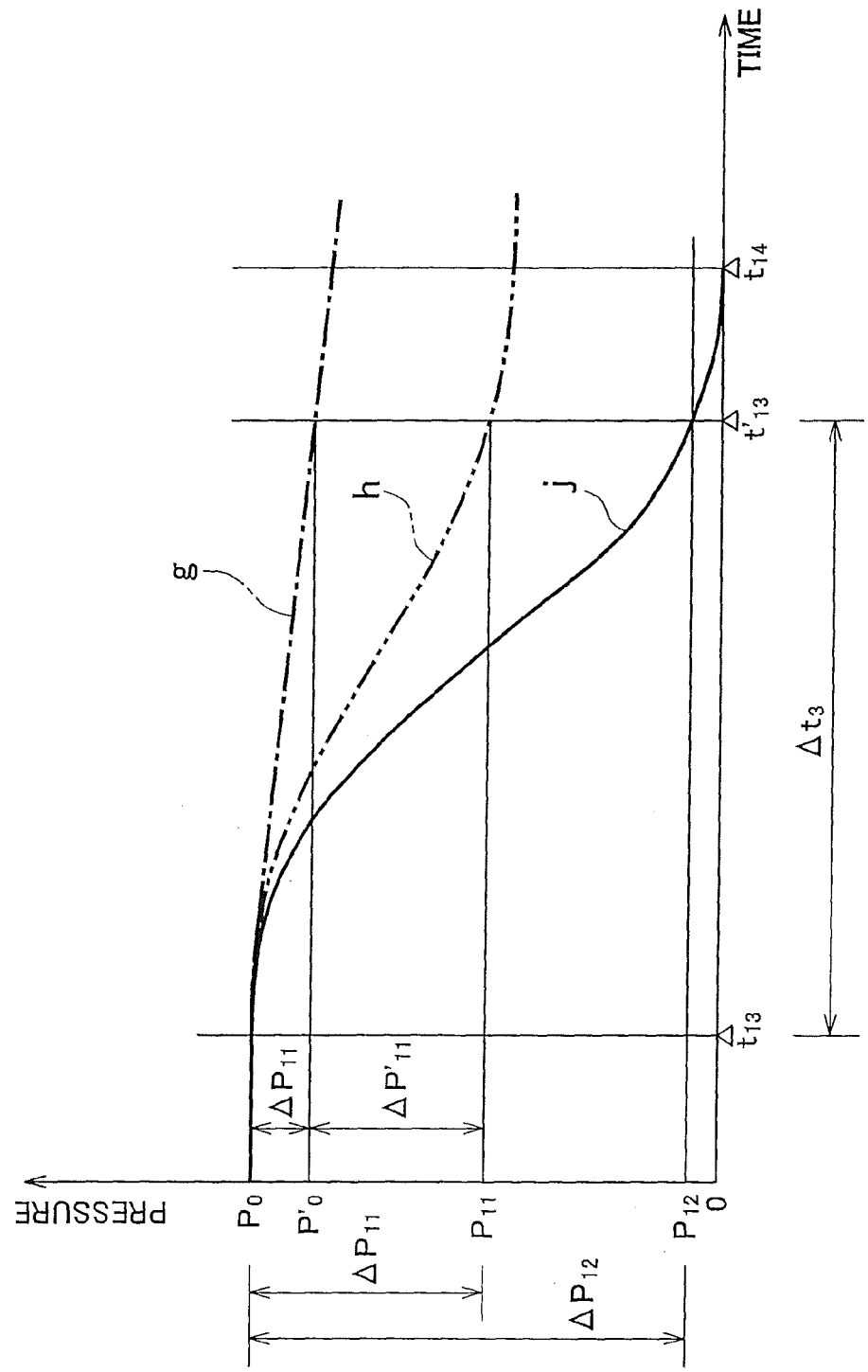
FIG. 6 is a graph showing another example of decreases in the pressure of the sealed hydrogen system when the fuel cell system in the embodiment of the invention is started.

The pressure in the sealed region 46 slightly decreases from the pressure $P_0$ to the pressure $P_0'$ as shown by a dashed one-dotted line g in FIG. 6, due to the cross leak between the fuel electrode and the oxidant electrode even in the case where no hydrogen is consumed within the fuel cell 11. As shown in FIG. 6, during a time interval $\Delta t_3$ from time $t_{13}$ to time $t_{13}'$ the pressure decreases by an amount $\Delta P_{10}$ from the initial pressure $P_0$ to the end pressure $P_0'$. The pressure decrease $\Delta P_{10}$ can be estimated from the side of the fuel cell 11, or the like. Therefore, the control portion 50 estimates the pressure decrease $\Delta P_{10}$, and stores the estimated value thereof beforehand in a memory.

Besides, in the case where the fuel cell 11 is outputting electric power as shown by a line f in FIG. 6 although the hydrogen system is in the sealed state, the hydrogen in the sealed region 46 is consumed by the electricity generation in addition to the consumption of hydrogen caused by cross leak, and therefore the pressure in the region 46 decreases by an amount $\Delta P_{11}$ from the initial pressure $P_0$ at time $t_{13}$ to the end pressure $P_{11}$ at time $t_{13}'$ as shown by a dashed two-dotted line h in FIG. 6. However, the pressure decrease $\Delta P_{11}'$ caused by the consumption of hydrogen by power generation can be estimated by a computation performed within the control portion 50 through the use of the FC voltage $V_F$ of the fuel cell 11 detected by the voltage sensor 43, and the output current $A_F$ of the fuel cell 11 detected by the electric current sensor 44. The control portion 50 stores into the memory a pressure decrease $\Delta P_{11}'$ that is estimated from the FC voltage $V_F$ and the output current $A_F$. The control portion 50 adds the stored pressure decrease $\Delta P_{11}'$ and the pressure decrease $\Delta P_{10}$ caused by the cross leak that has been stored in the memory to calculate a pressure decrease $\Delta P_{11}$. And then, using the pressure decrease $\Delta P_{11}$ and the time interval $\Delta t_3$, the control portion 50 calculates a rate of pressure decrease (second rate of pressure decrease) occurring in the case where hydrogen is consumed due to both the cross leak and the power generation, and stores the calculated rate in the memory.

In the case where there is leakage of hydrogen gas from the sealed hydrogen system while the fuel cell 11 is outputting current, the pressure in the sealed region 46 shown in FIG. 1 decreases by an amount $\Delta P_{12}$ from the initial pressure $P_0$ at time $t_{13}$ to an end pressure $P_{12}$ at time $t_{13}'$, as shown by a solid line j in FIG. 6. The pressure decrease $\Delta P_{12}$ in the time interval $\Delta t_3$ from time $t_{13}$ to time $t_{13}'$ is considerably larger than the pressure decrease $\Delta P_{11}$ that occurs in the same time interval in the case where hydrogen is consumed due to cross leak and electricity generation. Then, the control portion 50 calculates a rate of pressure decrease (third rate of pressure decrease) for use for the determination of the presence/absence of hydrogen leakage by subtracting the rate of pressure decrease (second rate of pressure decrease) stored earlier in the memory which occurs when there is no hydrogen leakage but there is consumption of hydrogen due to cross leak and electricity generation, from the rate of pressure decrease (first rate of pressure decrease) that is calculated from the pressure decrease $\Delta P_{12}$ detected in the time interval $\Delta t_3$. Then, the control portion 50 compares the rate of pressure decrease (third rate of pressure decrease) for the determination regarding the presence/absence of hydrogen leakage, with a prescribed threshold value, to determine whether there is hydrogen leakage.

The control portion 50, after sealing the hydrogen system as shown in step S209 in FIG. 7, acquires the values of the initial pressure $P_0$ in the region 46, the FC voltage $V_F$, and the FC current $A_F$ as shown in step S210 in FIG. 7. Then, the control portion 50 calculates the above-described first rate of pressure decrease as shown in step S213 in FIG. 7, and calculates the second rate of pressure decrease and then calculates the third rate of pressure decrease as shown in step S214 in FIG. 7. Then, the control portion 50 determines whether or not there is hydrogen leakage as shown in step S215 in FIG. 7.

If it is also determined that there is hydrogen leakage, in the hydrogen leakage presence/absence determination in step S215 in FIG. 7, the control portion 50 stops the fuel cell system 100 as shown in step S216 in FIG. 7.

On other hand, if it is determined that there is no hydrogen leakage in the hydrogen leakage determination in step S215 in FIG. 7, the control portion 50 starts the air compressor 19 at time $t_{14}$ in FIG. 5, as shown in step S217 in FIG. 7. As the air compressor 19 is started, the supply of air to the fuel cell 11 starts. As air begins to be supplied to the fuel cell 11, the electrochemical reaction between the hydrogen and the oxygen in the air begins within the fuel cell 11. Therefore, the FC current $A_F$ of the fuel cell 11 detected by the electric current sensor 44 gradually rises as shown by the line f in FIG. 5.

After the FC current $A_F$ of the fuel cell 11 has increased, the control portion 50 holds the state of the fuel cell system 100 during the stabilization time from time $t_{14}$ to time $t_{15}$ shown in FIG. 5, as shown in step S218 in FIG. 7, and then completes the starting of the fuel cell system 100 at time $t_{15}$ in FIG. 5, as shown in step S219 in FIG. 7.

In this embodiment, at the time of starting the fuel cell 11, the determination regarding the presence/absence of leakage of hydrogen gas can be performed after the FC voltage $V_F$ of the fuel cell 11 is lowered from the open-circuit voltage OCV to the operation voltage $V_0$. Therefore, it is possible to determine whether there is hydrogen leakage, without impairing the durability of the fuel cell 11.

In the foregoing embodiment, the rate of pressure decrease (third rate of pressure decrease) for use for the hydrogen leakage determination is calculated by subtracting the rate of pressure decrease (second rate of pressure decrease) stored earlier in the memory which occurs in the case where there is no hydrogen leakage but there is consumption of hydrogen due to electricity generation from the rate of pressure decrease (first rate of pressure decrease) that is calculated from the pressure decrease $\Delta P_{12}$ that is detected in the time interval $\Delta t_3$. Then, the rate of pressure decrease (third rate of pressure decrease) for the leakage determination is compared with the threshold value to determine whether or not there is hydrogen leakage. However, the determination regarding the presence/absence of hydrogen leakage may also be performed by comparing the rate of pressure decrease (first rate of pressure decrease) calculated from the pressure decrease $\Delta P_{12}$ detected in the time interval $\Delta t_3$ with a second threshold value that is greater than the prescribed threshold value. In this case, the second threshold value may be a sum of the prescribed threshold value and the rate of pressure decrease (second rate of pressure decrease) that occurs when there is no hydrogen leakage but there is consumption of hydrogen due to electricity generation.

While the invention has been described with reference to example embodiments thereof, it is to be understood that the invention is not limited to the described embodiments or constructions. To the contrary, the invention is intended to cover various modifications and equivalent arrangements. In addition, while the various elements of the disclosed invention are shown in various example combinations and configurations, other combinations and configurations, including more, less or only a single element, are also within the scope of the appended claims.

The invention claimed is:

1. A fuel cell system comprising
a fuel cell that generates electricity through an electrochemical reaction between a fuel gas and an oxidant gas;
a fuel gas supply portion that supplies the fuel gas to a fuel electrode of the fuel cell;
an oxidant gas supply portion that supplies the oxidant gas to an oxidant electrode of the fuel cell; and
a control portion which determines whether there is leakage of the fuel gas, the control portion first charges a secondary-side capacitor, and when a secondary-side voltage reaches an open-circuit voltage, then a start portion of the control portion starts the fuel cell by raising voltage of the fuel cell from a starting voltage to an operation voltage that is lower than the open-circuit voltage, and a leakage determination portion that determines whether there is leakage of the fuel gas, before the voltage of the fuel cell reaches the operation voltage that is lower than the open-circuit voltage when the fuel cell is started, wherein
the start portion raises the voltage of the fuel cell by supplying the fuel gas to the fuel electrode of the fuel cell by the fuel gas supply portion and then supplying the oxidant gas to the oxidant electrode by the oxidant gas supply portion;
the leakage determination portion determines whether there is leakage of the fuel gas during a period from when the fuel gas is supplied to when the oxidant gas starts to be supplied;
the fuel gas supply portion includes a fuel gas supply channel, and a fuel supply valve provided in the fuel gas supply channel, and further includes a gas discharge channel that discharges a post-reaction fuel gas from the fuel electrode of the fuel cell, a gas discharge valve provided in the gas discharge channel, and a pressure sensor that detects pressure in the fuel gas channel that is on a fuel electrode side of the fuel supply valve, and that is on a fuel electrode side of the gas discharge valve; and
the leakage determination portion closes the fuel supply valve and the gas discharge valve, and determines whether there is leakage of the fuel gas based on a first rate of pressure decrease that is detected by the pressure sensor and a second rate of pressure decrease which corresponds to an amount of fuel gas estimated from the current outputted from the fuel cell, which is detected by a current sensor which detects a current outputted from the fuel cell, and
the leakage determination portion calculates a third rate of pressure decrease for use for the determination of the presence or absence of hydrogen leakage by subtracting the second rate of pressure decrease, stored earlier in memory of the control portion, which occurs when there is no hydrogen leakage but there is consumption of hydrogen due to cross leak and electricity generation, from the first rate of pressure decrease that is calculated from the pressure decrease detected by the pressure sensor, and compares the third rate of pressure with a prescribed threshold, to determine whether there is leakage of the fuel gas.

2. An electric vehicle equipped with the fuel cell system according to claim 1.

3. A control method for a fuel cell system that includes a fuel cell that generates electricity through an electrochemical reaction between a fuel gas and an oxidant gas, comprising:
charging a secondary-side capacitor;
when a secondary-side voltage reaches an open-circuit voltage, starting the fuel cell by raising voltage of the fuel cell from a starting voltage to an operation voltage that is lower than the open-circuit voltage; and
determining whether there is leakage of the fuel gas based on a first rate of pressure decrease in a fuel gas channel that is detected by a pressure sensor, when the fuel gas is channel is in a closed state, and a second rate of pressure decrease which corresponds to an amount of fuel gas estimated from the current outputted from the fuel cell, which is detected by a current sensor which detects a current outputted from the fuel cell, and
calculating a third rate of pressure decrease for use for the determination of the presence or absence of the hydrogen leakage by subtracting the second rate of pressure decrease, stored earlier in memory of a control portion, which occurs when there is no hydrogen leakage but there is consumption of hydrogen due to cross leak and electricity generation, from the first rate of pressure decrease that is calculated from the pressure decrease detected by the pressure sensor, and comparing the third rate of pressure with a prescribed threshold, to determine whether there is leakage of the fuel gas.

* * * * *